United States Patent [19]

Spears

[11] Patent Number: 5,090,643
[45] Date of Patent: Feb. 25, 1992

[54] FORCE GENERATING SYSTEM

[76] Inventor: Morton F. Spears, P.O. Box 466, Cataumet, Mass. 02534

[21] Appl. No.: 494,156

[22] Filed: Mar. 15, 1990

[51] Int. Cl.$^5$ .................. B64G 1/46; G09B 23/18
[52] U.S. Cl. .................. 244/163; 361/234; 434/283; 434/301
[58] Field of Search .................. 361/232, 231, 234; 244/162, 163, 66, 158 R; 434/372, 366, 301, 283

[56] References Cited

U.S. PATENT DOCUMENTS

| 3,095,167 | 6/1963 | Dudley | 244/66 |
|---|---|---|---|
| 3,253,200 | 5/1966 | Klass et al. | 361/234 |
| 3,534,926 | 10/1970 | Wuenscher | 244/1 |
| 3,675,879 | 7/1972 | Fuchs | 244/1 SC |
| 3,717,801 | 2/1973 | Silverberg | 361/234 |
| 4,185,972 | 1/1980 | Nitta et al. | 55/155 |
| 4,308,223 | 12/1981 | Stern | 264/22 |
| 4,513,049 | 4/1985 | Yamasaki et al. | 264/22 |
| 4,588,537 | 5/1986 | Klaase et al. | 428/194 |
| 4,626,263 | 12/1986 | Inoue et al. | 55/155 |
| 4,751,609 | 6/1988 | Kasahara | 361/234 |
| 4,766,515 | 8/1988 | Bollen et al. | 361/234 |
| 4,864,461 | 9/1989 | Kasahara | 361/234 |

FOREIGN PATENT DOCUMENTS 0846097 9/1939 France .................. 361/231

Primary Examiner—A. D. Pellinen
Assistant Examiner—Richard Elms
Attorney, Agent, or Firm—Fish & Richardson

[57] ABSTRACT

An artificial gravity generation system consisting of at least one pair of high-voltage electrodes. A plurality of electrodes of alternating polarity may be arranged in a grid pattern to form an artificial gravity mat which may be used in spacecraft. The system may also be used outside a spacecraft to retrieve floating objects.

12 Claims, 3 Drawing Sheets

FORCE GENERATING SYSTEM

BACKGROUND OF THE INVENTION

The present invention relates to systems for the generation of an attractive force in order to provide artificial gravity in a net-zero or low gravity environment such as that found in a satellite space vehicle, space station or other spacecraft.

There are many uses for artificial gravity aboard spacecraft. Prolonged exposure to low gravity has been shown to be detrimental to the health of astronauts. Free objects need to be tied down or they can float away, and accidentally spilled liquids or solids can float off in unpredicted directions, which can be dangerous as well as messy. In addition, a method of generating artificial gravity could be useful as a means of attracting objects outside of the spacecraft. This capability would be valuable in recovering equipment or personnel accidentally lost into space, or pulling in other floating objects or debris.

SUMMARY OF THE INVENTION

It is the objective of the present invention to create artificial gravity that does not electrically charge objects and is capable of attracting positively charged, negatively charged, and uncharged magnetic or non-magnetic objects.

These and other objectives are achieved by means of one or more pairs of electrodes across which a potential difference is applied. These electrode pairs attract all objects regardless of their electromagnetic properties in a manner which closely simulates the action of gravity.

These pairs may be assembled in a grid pattern, to create a surface that will attract objects, thus providing an artificial gravity. These grids may be made into mats that may then be used on floors, tables or wherever artificial gravity is required. The mats may be electrically insulated to provide safety isolation from the energized electrodes.

DESCRIPTION OF THE PREFERRED EMBODIMENTS

The drawings are briefly described as follows.

Figure 1:
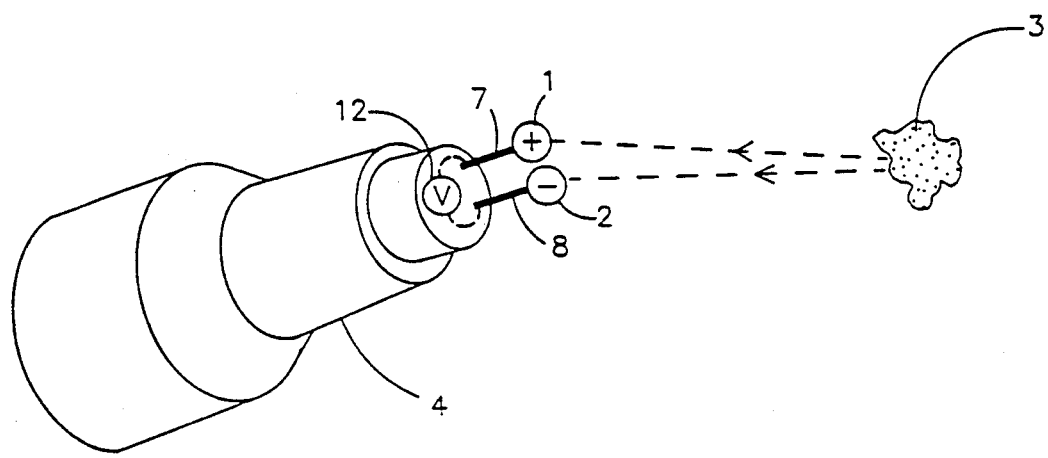
FIG. 1 is a perspective view of a spacecraft equipped with an electrode pair.

The embodiments described below are designed to implement artificial gravity in a low gravity environment. In a first embodiment of the invention, a system is designed to attract objects at a distance from a spacecraft. Referring to FIG. 1, the spacecraft 4, has a positive, metal electrode 1, and a negative, metal electrode 2, mounted on its outside surface. A high, preferably 10 KV or more, potential is applied between these two electrodes by a power supply 12, placed inside (or outside) of the spacecraft. This potential difference causes a free floating object 3 to be attracted towards the spacecraft.

Figure 2:
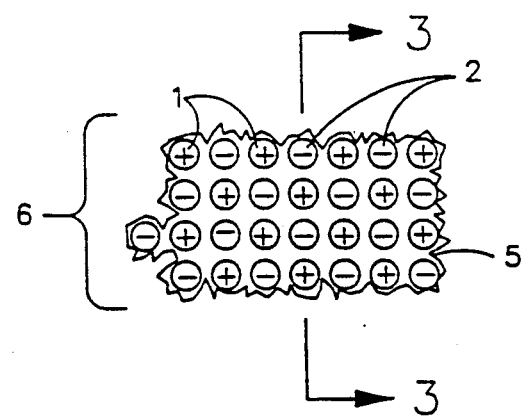
FIG. 2 is a top view of an artificial gravity mat.

In a second embodiment of the invention, a mat is formed which is used to create artificial gravity. Referring to FIG. 2, the mat 6, is made up of a sheet of insulating material 5, surrounding a plurality of positive metal electrodes 1 and a plurality of negative metal electrodes 2. The insulation material between electrodes should be a good one, such as TEFLON ®. The electrodes are oriented in a grid of alternating positive and negative electrodes, such that each electrode is immediately adjacent to electrodes of the opposite polarity. Electrode size and grid spacing are not critical working well in one embodiment of ¼ inch diameter disk electrodes with center to center spacing of about ½ inch. The electrodes may be other than round disks, and may have square or other face shapes. The grid may be a right-angled grid, as shown in FIG. 2, or it may have another grid arrangement.

Figure 3:
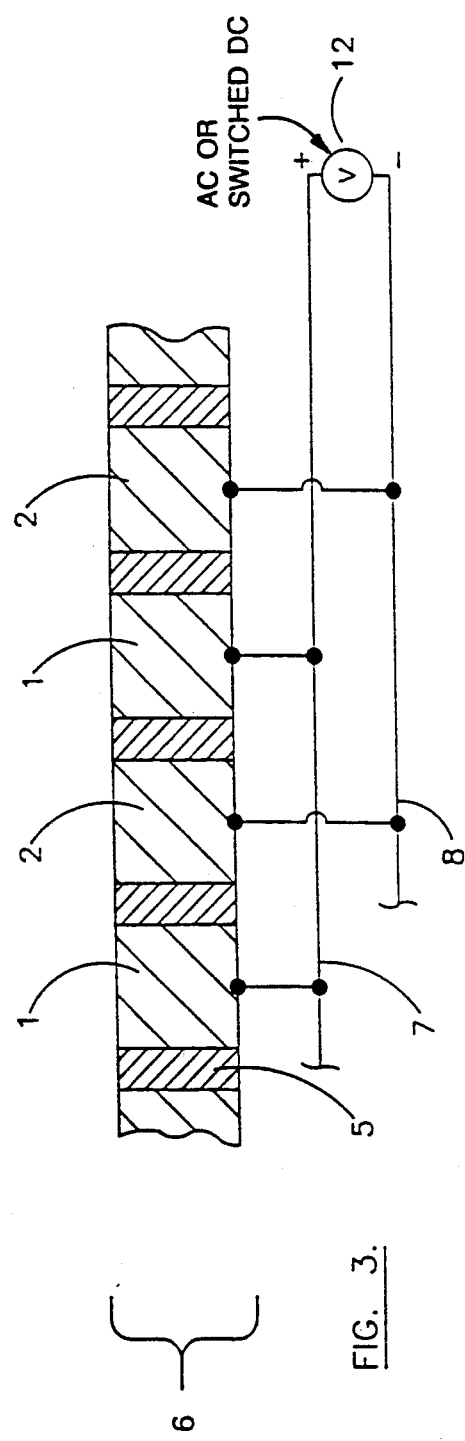
FIG. 3 is a sectional view of an artificial gravity mat taken along lines 3—3 of FIG. 2, with electrical connections schematically indicated.

Referring to FIG. 3, it can be seen that the positive electrodes 1 are connected on the underside via positive supply leads 7 to the positive terminal of a high voltage (e.g. 10 KV) power supply 12. Similarly, the negative electrodes 2 are connected by negative supply leads 8 to the negative terminal of power supply 12. Again, the supply applies a high voltage between alternate electrodes. The top of the mat attracts objects thus creating artificial gravity.

It has been found that periodically reversing the polarity between the electrodes is advantageous. This can be accomplished by using either an AC power supply or a switched DC supply for power supply 12. If the potential is not periodically reversed the insulation tends to acquire a charge polarity which reduces the effectiveness of the mat. Electrode polarity reversal rates are preferably in the range 0.1 to 100 Hz.

Figure 4:
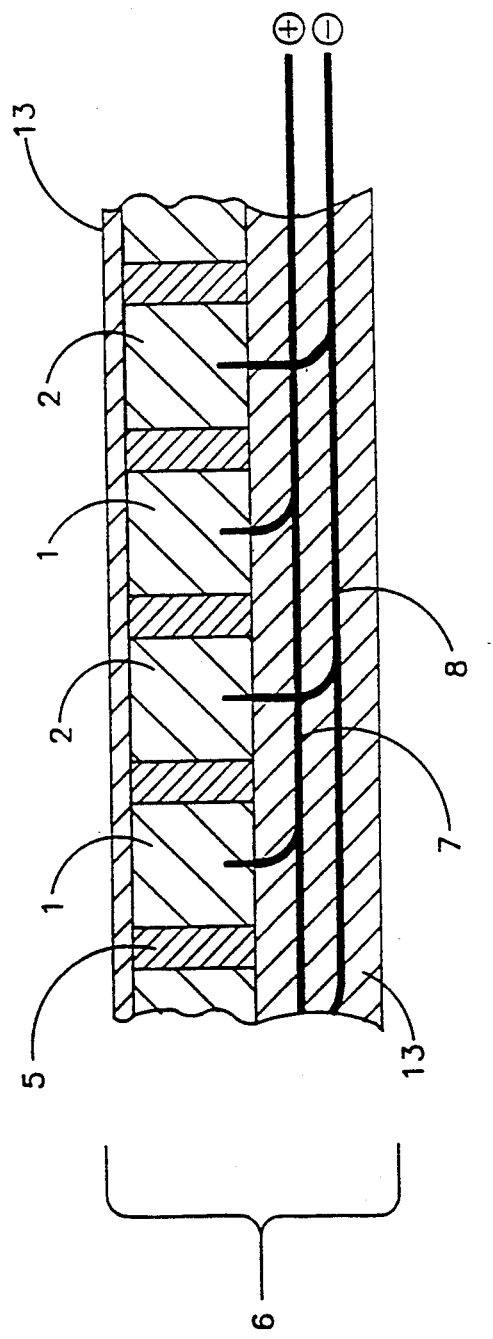
FIG. 4 and 5 are sectional views, like that of FIG. 3, of alternate embodiments of an artificial gravity mat with insulating covering.
Figure 5:
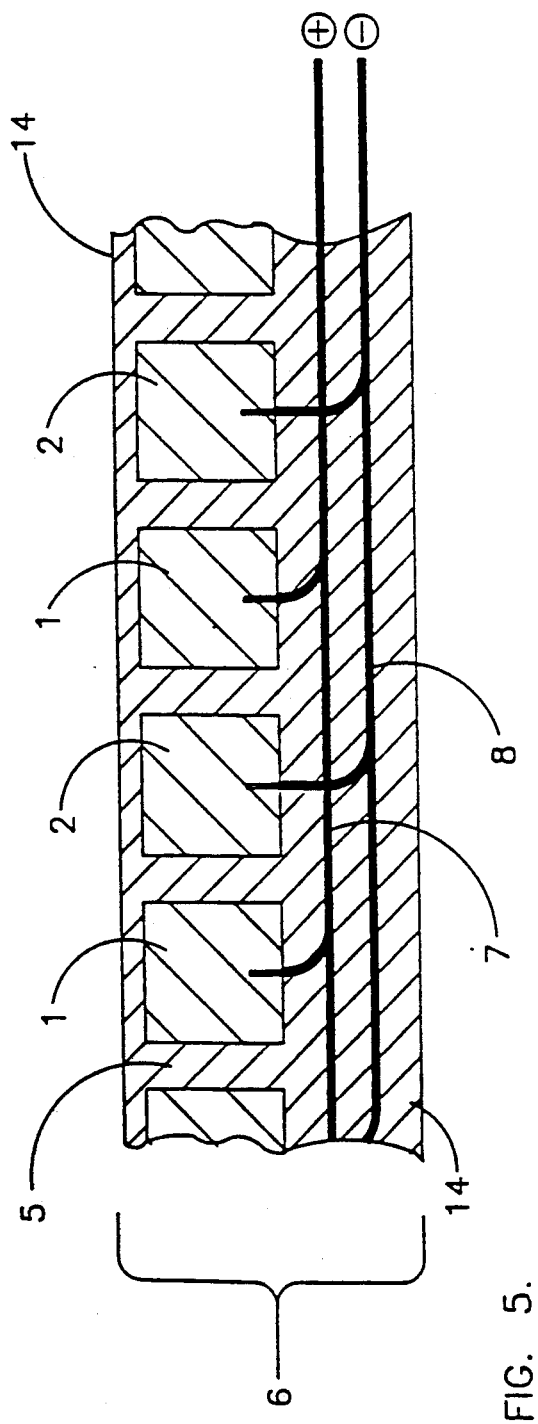

If one is using the mat to attract conductive objects or living organisms, the mat may be insulated as shown in FIG. 4, where insulating layers 13 are used to keep objects or people from touching the electrodes. Alternatively, the inter-electrode and covering insulation can be an integral matrix 14, as shown in FIG. 5.

One convenient method to build these mats is by multilayer printed circuit board techniques. The top layer of the circuit board may have the electrodes patterned onto it while the lower layers serve to connect the supply leads to the electrodes. The top and bottom of the mat could then be insulated as needed.

Figure 6:
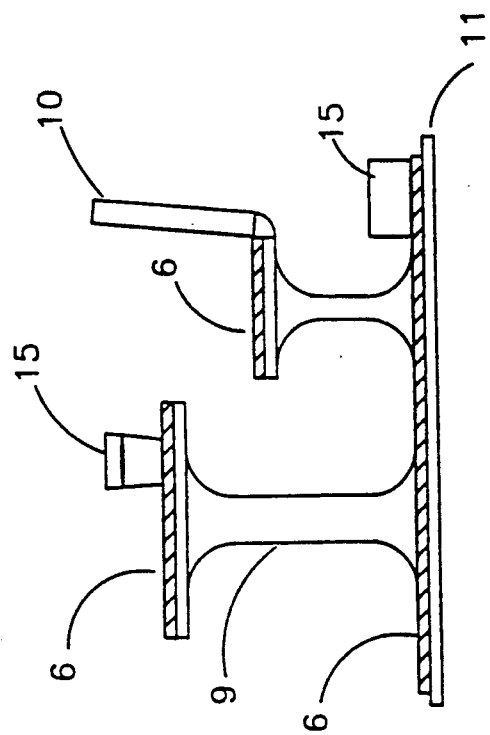
FIG. 6 shows a work station in a low-gravity environment equipped with artificial gravity mats.

In FIG. 6, examples of uses of the mats are shown. A mat 6 is secured, e.g., by adhesive or other fastening means, to the floor 11 of a spacecraft, a table 9 and chair 10, thus creating an artificial gravity to hold down objects 15.

The invention offers the advantage of artificial gravity on command, without magnetic or centrifugal contrivances.

Other embodiments are within the scope of the following claims. For example, while flat checkerboard-patterns of opposite electrodes are shown, curved surfaces may also be fabricated for similar uses.

What is claimed is:

1. Apparatus for creating an attractive force, comprising:
   a first plurality of electrodes, each of said electrodes having an attracting end and a connection end, said attracting ends being disposed on a surface in a matrix,
   a second plurality of electrodes, each of said electrodes having an attracting end and a connection end, said attracting ends of said second plurality being disposed on said surface in said matrix so as to form with said attracting ends of said first plurality of electrodes a checkerboard-pattern grid of alternating electrodes, such that each electrode of said first plurality is disposed immediately adjacent to electrodes of said second plurality, a first insulator separating said first and second pluralities of electrodes, and a power supply for applying an electrical voltage between said connection ends of said first plurality of electrodes and said connection ends of said second plurality of electrodes.

2. The apparatus of claim 1, wherein said power supply is an AC power supply.

3. The apparatus of claim 1, wherein said power supply is a switched DC power supply.

4. The apparatus of claim 1, wherein said grid is planar.

5. The apparatus of claim 1, further including a second insulator covering said attracting ends of said first plurality of electrodes and said attracting ends of said second plurality of electrodes.

6. A mat for creating an attracting force, comprising:
a first plurality of electrodes, each of said electrodes having an attracting end and a connection end, said attracting ends being disposed on a surface in a matrix, a second plurality of electrodes, each of said electrodes having an attracting end and a connection end, said attracting ends of said second plurality being disposed on said surface in said matrix so as to form with said attracting ends of said first plurality of electrodes a checkerboard-pattern grid of alternating electrodes, such that each electrode of said first plurality is disposed immediately adjacent to electrodes of said second plurality, an insulator separating said first and second pluralities of electrodes, and for covering said attracting ends of said first and second pluralities of electrodes, and a periodically alternating power supply for applying an electrical voltage between said connection ends of said first plurality of electrodes and said connection ends of said second plurality of electrodes.

7. A spacecraft comprising:
a space vehicle structure,
means on said vehicle defining a surface, and
a mat mounted on said surface, said mat comprising:
a first plurality of electrodes, each of said electrodes having an attracting end and a connection end, said attracting ends being disposed in said mat in a matrix, a second plurality of electrodes, each of said electrodes having an attracting end and a connection end, said attracting ends of said second plurality being disposed in said mat in said matrix so as to form with said attracting ends of said first plurality of electrodes a checkerboard-pattern grid of alternating electrodes, such that each electrode of said first plurality is disposed immediately adjacent to electrodes of said second plurality, an insulator separating said first and second pluralities of electrodes, and for covering said attracting ends of said first and second pluralities of electrodes, and a periodically alternating power supply for applying a periodically alternating electrical voltage between said connection ends of said first plurality of electrodes and said connection ends of said second plurality of electrodes.

8. The spacecraft of claim 7, wherein said surface comprises a table top.

9. A method of attracting objects, said method including the steps of
providing a first plurality of electrodes, each of said electrodes having an attracting end and a connection end, said attracting ends being disposed on a surface in a matrix, providing a second plurality of electrodes, each of said electrodes having an attracting end and a connection end, said attracting ends of said second plurality being disposed on said surface in said matrix so as to form with said attracting ends of said first plurality of electrodes a checkerboard-pattern grid of alternating electrodes, such that each electrode of said first plurality is disposed immediately adjacent to electrodes of said second plurality, providing an insulator to separate said first and second pluralities of electrodes, and applying a periodically alternating potential between said connection ends of said first plurality of electrodes and said connection ends of said second plurality of electrodes.

10. The method of claim 9 further including the step of providing a further insulator for covering said attracting ends of said first and second pluralities of electrodes.

11. The method of claim 10, wherein said steps of providing electrodes and insulators are applied to a surface of a spacecraft.

12. The method of claim 10, wherein said steps of providing electrodes and insulators are applied to a table top surface.

* * * * *